No. 787,427. PATENTED APR. 18, 1905.
K. H. BINDLER.
DIVIDING MACHINE FOR PASTE, DOUGH, OR THE LIKE.
APPLICATION FILED JUNE 20, 1904.

2 SHEETS—SHEET 1.

Witnesses:
Thomas Durant
Melville D. Church

Inventor:
Karl H. Bindler
by Church & Church
his Attys

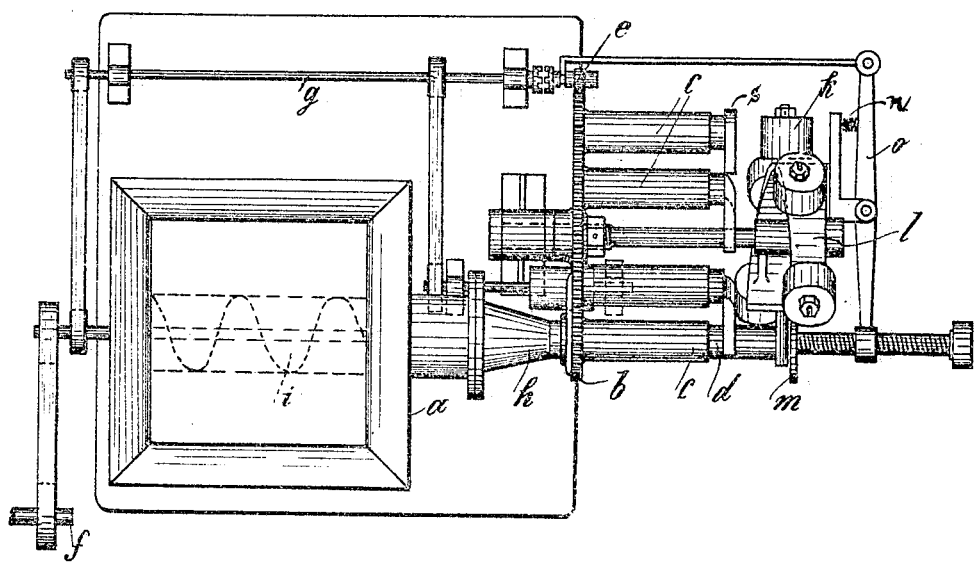

No. 787,427. Patented April 18, 1905.

UNITED STATES PATENT OFFICE.

KARL HEINRICH BINDLER, OF DRESDEN, GERMANY.

DIVIDING-MACHINE FOR PASTE, DOUGH, OR THE LIKE.

SPECIFICATION forming part of Letters Patent No. 787,427, dated April 18, 1905.

Application filed June 20, 1904. Serial No. 213,350.

*To all whom it may concern:*

Be it known that I, KARL HEINRICH BINDLER, a subject of the King of Saxony, residing at Dresden, Saxony, Germany, have invented certain new and useful Improvements in or Relating to Dividing-Machines for Paste, Dough, or the Like, of which the following is a specification.

The object of the present invention is the obviation of a drawback inherent in many paste-dividing machines of present construction. This drawback consists in the fact that the same quantity of paste or dough is not always supplied by the mold-cells to the dividing disk or plate.

The dividing-disk is turned in the above-mentioned machines at certain time intervals by means of a ratchet-gear or the like in front of the worm-conveyer reservoir, the said worm conveyer rotating in a continuous manner. In order that the molding-cells may always supply the same quantity, both the worm conveyer and the gear effecting the intermittent movement of the dividing-plate must act in a very exact manner, both independently and together. Even assuming that the outer driving-gear always effects the movement at equal intervals it is impossible to attain exact coöperation of the worm conveyer with it for any length of time, as has been proved by practical experience. Although during the periods of rest of the dividing-plate the worm now and then does act in an accurate manner, it usually feeds, especially after the machine has been in use for any length of time, either less or more than the quantity required.

In the machine according to this invention the movement of the dividing-disk is started as soon as a molding-cell has received the desired quantity of dough, neither before nor later. This is effected by an adjustable piston contained in the molding-cell and adapted to be forced back by the dough entering the cell being pressed against an adjustable stop, which effects the coupling of the constantly-rotating main driving-shaft with the gearing driving the dividing-plate.

A construction of the machine according to this invention is illustrated by way of example in the accompanying drawings, in which—

Figure 1:
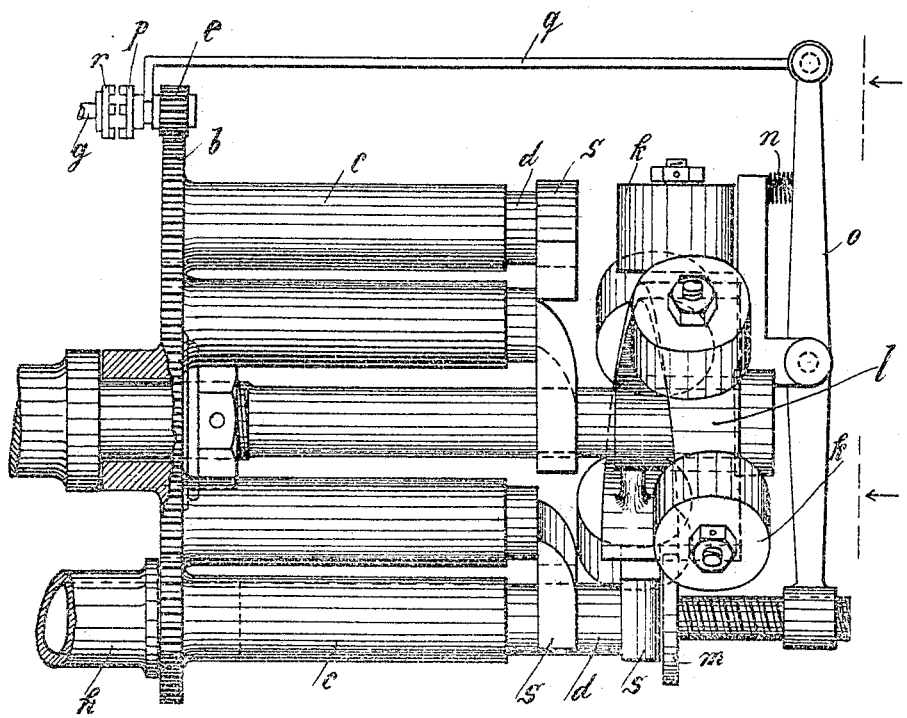
Figure 2:
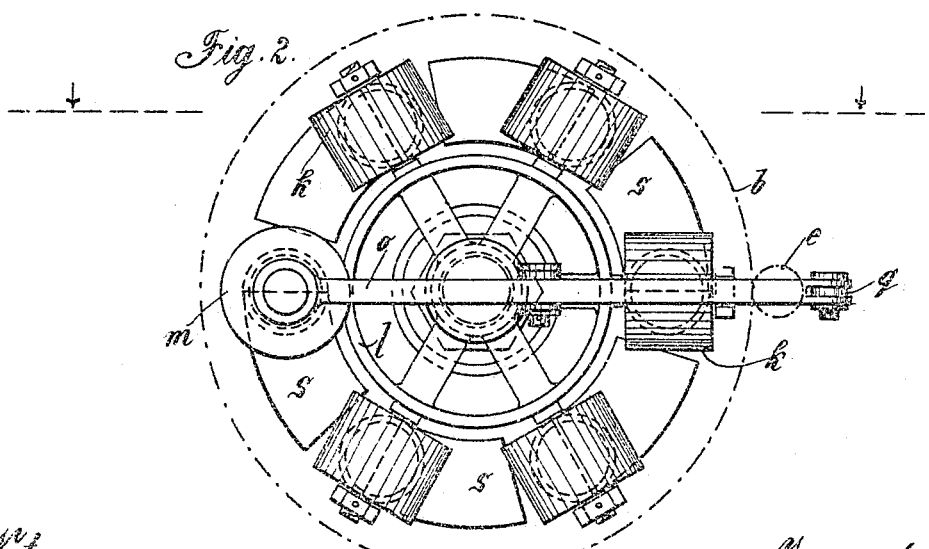

Figure 1 is a plan view of the apparatus, and Fig. 2 an end view seen in the direction of the arrow of Fig. 1. Fig. 3 shows in top plan the dough-dividing device on a vacuum-machine, illustrating the operating mechanism of the whole machine.

The dividing-plate $b$, arranged in front of the vacuum-machine $a$, is provided with molding-cells $c$, in which are arranged movable pistons $d$. This dividing-plate $b$, with a toothed periphery, can be connected to the spindle $g$, constituting or coupled to the main driving-shaft by means of a clutch and toothed wheel $e$, Fig. 3. When it is so connected, the plate $b$ rotates immediately in front of the mouth $h$ of the vacuum-machine. When the spindle $g$ is disconnected from the dividing-plate, one of the cylinders $c$ rests exactly in front of the mouthpiece or nozzle $h$. During this period of rest the worm conveyer $i$ forces dough into the cell in front of the nozzle $h$, and the dough forces out the piston from the said cell $c$. As soon as the cell has been filled to the required extent the dividing-plate starts moving again, and the piston $d$ is automatically forced back into its cell $c$ and the dough pushed out of the cell $c$ by the piston $d$, so that it may be removed. The return movement of the piston $d$ is effected by the ends of the pistons passing in front of a series of rollers $k$ during the rotation of the dividing-plate $b$. The centers of these rollers $k$ are arranged on a curve $l$, Fig. 1, in such manner that each piston when rotating is successively forced farther and farther into the cell $c$ until it has driven the dough completely out of the cell $c$.

The coupling of the dividing-plate $b$ with the spindle $g$ is effected according to the present invention in the following manner: After the worm $i$ has conveyed the desired quantity of dough into the cell $c$ the dough will have forced the piston $d$ outward to such an extent that its end, provided with a head $s$, strikes an adjustable stop $m$. This stop $m$ is mounted on a double-armed lever $o$, acted upon by a spring $n$ and actuating a rod $q$, adapted to operate the clutch member $p$ of the toothed wheel $e$. As the quantity of dough introduced into the cell $c$ increases, the lever $o$ and the rod $q$, acting against the pressure of the spring $n$, will move the clutch $p$ more and more to the left, Fig. 1, and toward the clutch member $r$, mounted on the spindle $g$, until the two members engage, and the toothed wheel $e$ becoming coupled with the spindle $g$ the dividing-plate $b$, with the cells $c$ and the pistons $d$, begins to turn. The turning of the dividing-plate continues until the head $s$, mounted on the end of the piston $d$, passes free of the stop $m$. As soon as this head $s$ has passed the stop $m$ the lever $o$, the rod $q$, and the clutch member $p$ move back under the influence of the spring $n$ into their original position, so that the toothed wheel $e$ is again disconnected from the spindle $g$, and the dividing-plate $b$ stops. The length of the head $s$ is such that the next cell $c$ is exactly in front of the nozzle $h$ when the stop $m$ is released and the uncoupling takes place.

The variation of the quantities of dough to be introduced into the cells $c$ is effected by making the stop $m$ in the form of a set-screw adjustable on the lever $o$, so that more or less dough can be introduced into the cell before the head $s$ strikes the stop $m$.

What I claim as my invention, and desire to secure by Letters Patent, is—

1. A dough-dividing machine, comprising a dough-feeding device, an intermittently-rotating dough-dividing plate, cylindrical dough-containing cells in said dividing-plate, pistons in said cells and an automatic dough-expelling device, in combination with an adjustable piston-operated starting and stopping device for said dividing-plate; substantially as set forth.

2. A dough-dividing machine, comprising a dough-feeding device, an intermittently-rotating dough-dividing plate, cylindrical dough-containing cells in said dividing-plate, pistons in said cells and cam-rollers, engaging with said pistons, in combination with an adjustable, piston-operated, starting and stopping device for said dividing-plate; substantially as set forth.

3. In a dough-dividing machine, a starting and stopping device for the dividing-plate comprising a double-armed lever adapted to be operated by the pistons of the dough-containing cells and by a returning-spring, and a clutch-coupling upon the driving-shaft operated by the said lever, substantially as described.

4. In a dough-dividing machine, a starting and stopping device for the dividing-plate comprising dough-containing cells, pistons in said cells, cam-heads for said pistons, a double-armed lever operated by said pistons and a clutch-coupling operated by said lever; substantially as set forth.

5. In a dough-dividing machine, a starting and stopping device for the dividing-plate comprising dough-containing cells, pistons in said cells, cam-heads for said pistons, a double-armed adjustable head-bearing lever, operated by said pistons, and a clutch-coupling operated by said lever; substantially as set forth.

In testimony whereof I have signed my name to this specification in the presence of two subscribing witnesses.

KARL HEINRICH BINDLER.

Witnesses:
  KARL GREIERT,
  OTTO WOLFF.